Oct. 9, 1962   V. SVATÝ ETAL   3,057,224
PROGRAM CONTROL MEANS
Filed June 14, 1961   2 Sheets-Sheet 1

Oct. 9, 1962  V. SVATÝ ETAL  3,057,224
PROGRAM CONTROL MEANS

Filed June 14, 1961  2 Sheets-Sheet 2

INVENTORS.
Vladimír Svatý
BY Miloslav Ofta
Vladimír Houde

United States Patent Office 3,057,224
Patented Oct. 9, 1962

3,057,224
PROGRAM CONTROL MEANS
Vladimír Svatý and Miloslav Otta, Liberec, and Vladimír Houdek, Brno, Czechoslovakia, assignors to Sdruzeni podniku textilního strojirenstvi, Liberec, Czechoslovakia
Filed June 14, 1961, Ser. No. 117,032
Claims priority, application Czechoslovakia June 16, 1960
7 Claims. (Cl. 74—568)

The object of this invention is to provide a control body for a program control device which can be employed for controlling the dobbies of weaving looms, the control means of knitting machines, automated machine tools and the like.

Existing program control devices have various forms of control members, such as cards with wooden pegs secured thereon, perforated paper or metal cards, and other mechanical supports carrying pegs, rollers or balls. These control members are either supported by a band or by a chain and their number is variable so that the sequence can be changed, or they are supported by a disc or drum, so that the control sequence is repeated periodically. Both types of support are used in practice, the first, namely, a supporting band or chain, for the possibility of its wide application, and the second, that is, a supporting disc or drum, for its simplicity and reliability depending upon the requirements of the different applications.

A disadvantage of the existing arrangements using a disc or drum with operating elements in the form of pegs, balls or the like projecting therefrom has been the fact that such elements had to be fixed on the circumference of the drum or disc rather laboriously, and thus complicated the assembly of the device and any change of the pattern of the pegs or balls on the cylinder or disc.

It is an object of this invention to avoid the above disadvantage and to provide for the simple manufacture and easy exchange and fixing of the operating elements on the surface of the control cylinder, disc or other supporting body.

In accordance with an essential feature of this invention, the surface of the control body of the program control device is provided with series of mutually intersecting grooves and, into the spaces defined by the edges of these mutually intersecting grooves, the operating elements are inserted. The operating elements are maintained in these spaces by magnetic means, or by a circumferential cover within which the drum or disc is rotated.

Further advantages and features of this invention are apparent in the following detailed description of illustrative embodiments shown in the accompanying drawing, wherein.

Figure 1:
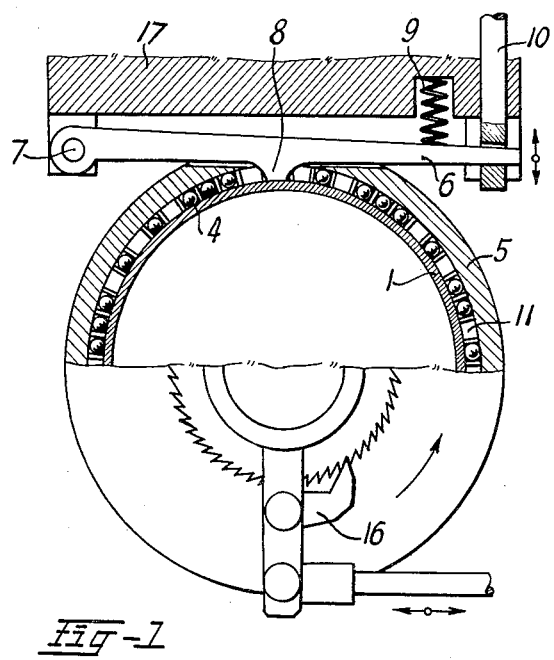
FIG. 1 is a side elevational view, partly in cross section, and showing an embodiment of the invention in which the control body has the shape of a rotating cylinder or drum.

The control body is, in the case illustrated, a rotating cylinder 1 provided with axially and circumferentially extending series of mutually intersecting grooves 2 and 3, respectively (FIG. 2), whereby spaces 11 are defined by the edges 12, 13, 14, 15 of the mutually intersecting grooves 2 and 3. Operating elements, for instance balls 4 are inserted freely in selected spaces 11. The selection of the individual spaces 11 occupied by these operating elements (balls) 4 is in accordance with a predetermined program. The desired central order is produced when the corresponding operating element 4, in the course of the rotation of the cylinder 1, engages a scanning lever 6 which is freely pivotable on a shaft 7 carried by the frame 17 of the machine to be controlled and provided with an extension 8 extending into a related one of the circumferential grooves 3. Each scanning lever 6 is pressed against the surface of the cylindrical control body 1 by a spring 9. In accordance with the presence or absence of an operating element within the space 11 then located at the top of control body 1, or in accordance with the height of the operating element in such space, a sequence of impules is generated in response to the deviation of the lever 6 which is transmitted by a rod 10 to a control means (not shown) of any kind known to those skilled in the art. The rotational movement of control body 1 can be effected intermittently by a pawl mechanism 16 which is oscillated from a suitable drive member (not shown) of the associated machine. The operating elements 4 can be magnetically retained in the radial direction within the selected spaces 11, for example, by forming the body 1 as a permanent magnet from a suitably permanently magnetic material such as ferrite, while the operating elements 4 are formed of a ferromagnetic material, such as steel. Alternatively, as shown in FIG. 1, the operating elements 4 may be radially retained in the selected spaces 11 by means of a removable cover 5 extending circumferentially along at least the lower half of the cylindrical control body 1 and having an opening at least at the top of the latter through which the extensions 8 of the levers 6 can project into the circumferential grooves 3 of the control body. The spaces 11 defined by the edges 12, 13, 14, 15 of the mutually intersecting grooves 2 and 3 determine exactly the positions of the operating members 4 in all directions on the surface of the control body 1, that is, both axially and circumferentially.

The placing of the operating elements in the selected spaces 11 defined by the mutually intersecting grooves 2 and 3 of the control body takes place with the cover 5 removed, and involves simple inserting of these operating elements into the spaces, whereas removal of the operating elements, when a change in the controlled program is desired, is accomplished simply by inserting into any of the grooves a bent needle (not shown) so that, either by the movement of this needle or by turning of the control body 1, the operating element to be removed is engaged from below and lifted out of the space 11.

Figure 2:
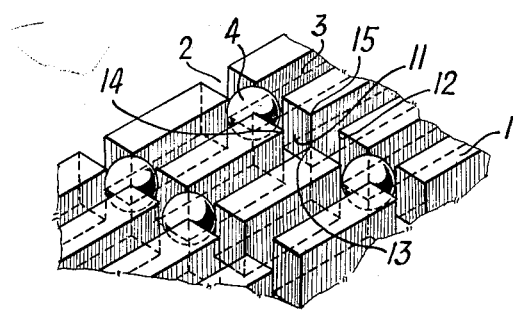
FIG. 2 is a detailed perspective view of a portion of the surface of the control body of FIG. 1 with operating elements in the form of balls inserted in the spaces defined by intersecting grooves.
Figure 3:
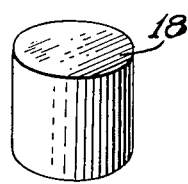
FIG. 3 is a perspective view of a cylindrical peg that can be employed in place of the balls shown as operating elements in the control body of FIGS. 1 and 2.
Figure 4:
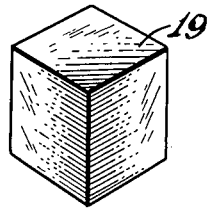
FIG. 4 is a perspective view of a prismatic peg usable as an operating element in the control body of FIGS. 1 and 2.
Figure 5:
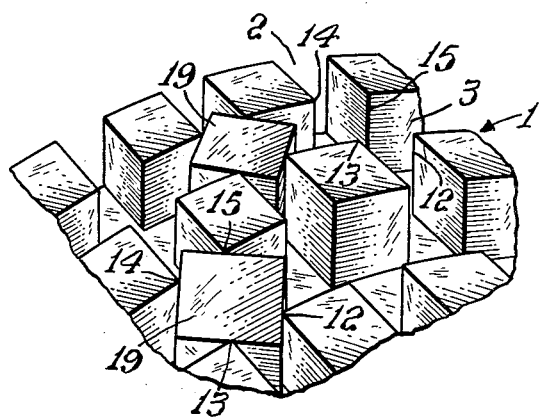
FIG. 5 is a fragmentary perspective view similar to that of FIG. 2, but showing the control body with prismatic pegs installed therein as the operating elements.

It is apparent that the spherical or ball-shaped operating elements 4 shown installed in selected spaces 11 of the control body 1 in FIGS. 1 and 2 may be replaced by cylindrical pegs 18 (FIG. 3) or by prismatic pegs 19 (FIGS. 4 and 5). Such pegs 18 or 19 are also dimensioned so that the minimum cross-sectional dimension thereof is less than the widths of the grooves 2 and 3. Thus, each peg is engaged by the edges 12, 13, 14 and 15 defining the corners of the related space 11 so as to be positively located with respect to the cylindrical control body 1 in both the axial and circumferential directions. Further, when employing the pegs 18 or 19 in place of the balls 4, the radial dimensions or heights of the pegs can be varied so as to cause varying degrees of angular displacement of the levers 6 when engaged by the latter. Thus, the control impulses generated in response to engagement of an extension 8 of a lever 6 by a peg 18 or 19 constituting an operating element may vary in accordance with the different angular displacements of the lever by pegs having correspondingly different heights.

Although illustrative embodiments of the invention have been described in detail herein with reference to the accompanying drawing, it is to be understood that the invention is not limited to those precise embodiments, and that various changes and modifications can be effected therein without departing from the scope or spirit of the invention, except as defined in the appended claims.

We claim:

1. In a program control device, a movable control body having a surface with series of intersecting grooves therein so that spaces are defined by edges at the intersections of said grooves, operating elements freely inserted in selected ones of said spaces and being held against displacement relative to said surface both in the direction of movement and transversely thereto by said edges defining the related spaces, and means releasably retaining said operating elements in said selected spaces.

2. In a program control device, the combination as in claim 1; wherein said means releasably retaining the operating elements in said selected spaces includes a removable cover extending closely adjacent to said surface along at least any position of the latter facing downwardly to prevent gravitational removal of said operating elements from said selected spaces.

3. In a program control device, the combination as in claim 1; wherein said means releasably retaining said operating elements in said selected spaces is magnetic.

4. In a program control device, the combination as in claim 1; wherein said operating elements are in the form of balls.

5. In a program control device, the combination as in claim 1; wherein said operating elements are in the form of pegs.

6. In a program control device, the combination as in claim 5; wherein said pegs are of different heights.

7. In a program control device, the combination as in claim 1; wherein said control body is cylindrical and is rotated about its longitudinal axis, and said series of intersecting grooves extend circumferentially and axially, respectively, on said surface of the cylindrical body.

References Cited in the file of this patent

UNITED STATES PATENTS

| 127,055 | Hillsley | May 21, 1872 |
| 2,019,396 | Deans et al. | Oct. 29, 1935 |
| 2,333,248 | Harvey | Nov. 2, 1943 |
| 2,761,510 | Stough | Sept. 4, 1956 |
| 2,816,790 | Johnson | Dec. 17, 1957 |

FOREIGN PATENTS

| 486,531 | Great Britain | June 7, 1938 |
| 735,993 | Germany | June 3, 1943 |